S. C. CARTER.
FRICTION BAND CLUTCH.
APPLICATION FILED MAR. 11, 1912.
1,099,636.
Patented June 9, 1914.
2 SHEETS—SHEET 1.
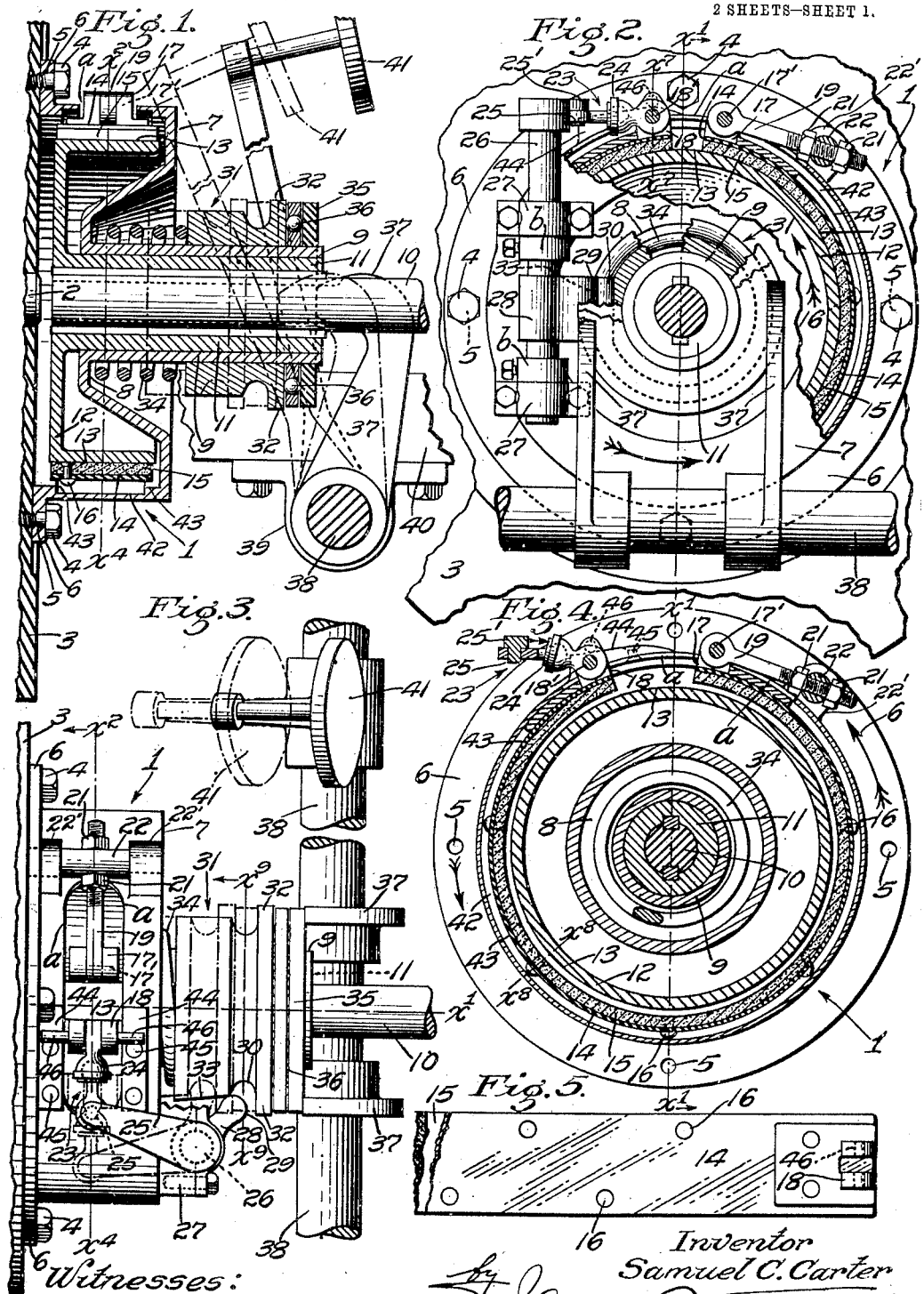
Witnesses:
H. N. Kirkby
L. Belle Rice
Inventor
Samuel C. Carter
by James R. Townsend
his atty

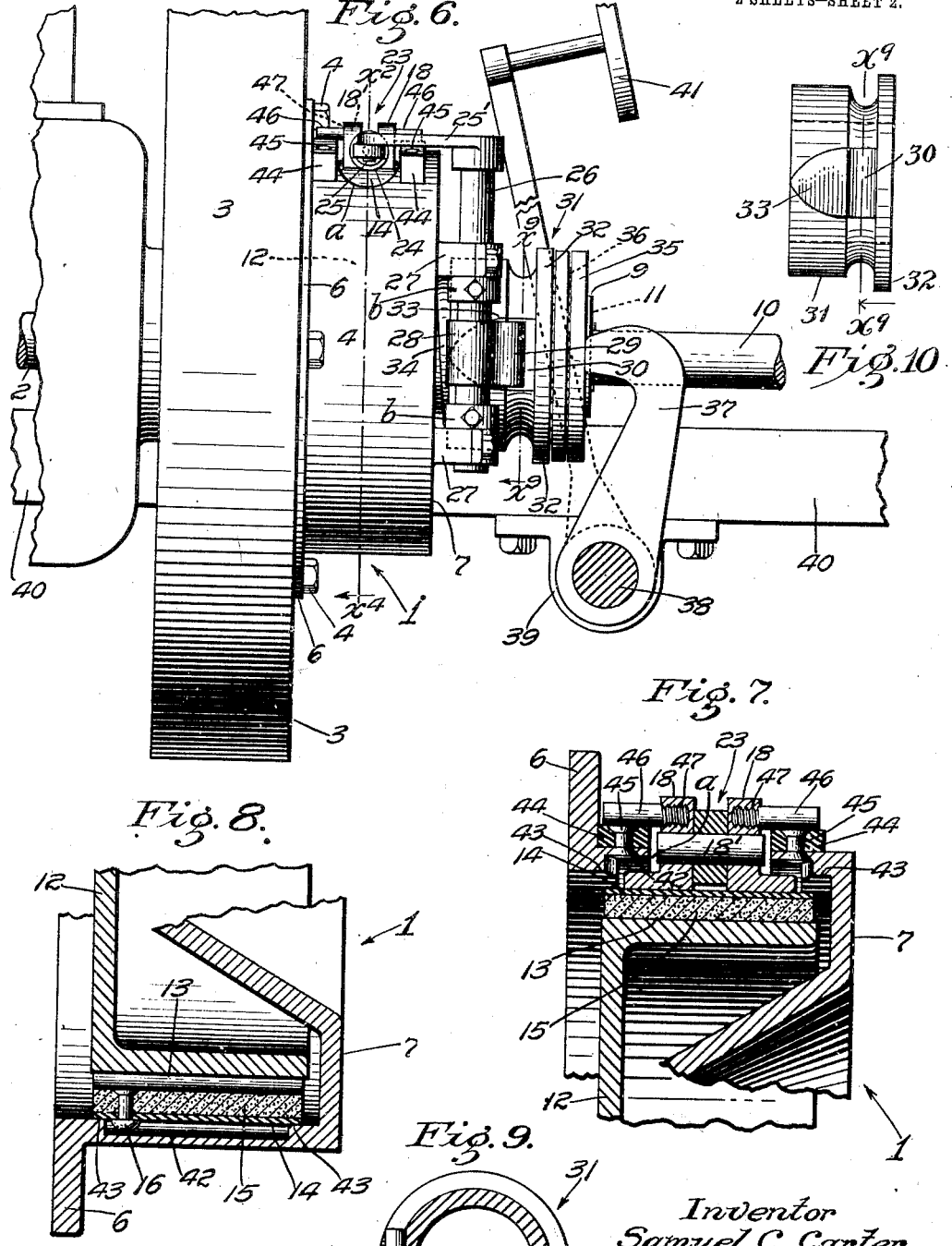

UNITED STATES PATENT OFFICE.

SAMUEL C. CARTER, OF LOS ANGELES, CALIFORNIA.

FRICTION-BAND CLUTCH.

1,099,636. Specification of Letters Patent. Patented June 9, 1914.

Application filed March 11, 1912. Serial No. 683,137.

*To all whom it may concern:*

Be it known that I, SAMUEL C. CARTER, a citizen of the United States, residing at Los Angeles, in the county of Los Angeles and State of California, have invented a new and useful Friction-Band Clutch, of which the following is a specification.

An object of this invention is to minimize the weight of the clutch member of the transmission shaft, and consequently the momentum of such shaft, so that upon release of the clutch the speed and direction of rotation of the transmission shaft may be changed with relation to that of the driving shaft without liability of stripping transmission gears.

Another object is to eliminate all sudden or jerky action during the clutching operation, and to this end I provide means for easing the operating end of the clutch band into gripping position, thus to cause said band to gradually grip the internal clutch member or drum of the transmission shaft.

Another object is to provide improved means to effect a positive and practically instantaneous complete release of the transmission shaft from the power shaft.

Another object of the invention is to provide a clutch which will automatically adjust itself to take up wear.

Other objects are simplicity, durability, cheapness of construction and ease of mounting.

The clutch may be embodied in different forms for transmitting power for different purposes. In this application the clutch is shown as applied to drive an automobile transmission shaft.

The accompanying drawings illustrate the invention.

Figure 1 is a fragmental mid-sectional view taken on line $x^1$, Figs. 2, 3 and 4, showing the clutch in engagement and mounted in place upon an engine flywheel, a fragment of which is shown. Dotted lines indicate the position of parts when the clutch is disengaged. Fig. 2 is a fragmental broken elevation from the right of Fig. 1, partly in section on line $x^2-x^4$, Figs. 1, 3 and 6. Parts are broken away to expose parts that would otherwise be hidden. Fig. 3 is a fragmental broken top plan of the clutch with parts in the position shown in Figs. 1 and 2. Dotted lines indicate the position of parts when the clutch is disengaged. Fig. 4 is a fragmental section on plane indicated by line $x^2-x^4$, Figs. 1, 3 and 6, showing the clutch disengaged and detached from the engine flywheel. Fig. 5 is a fragmental plan detail of one end of the clutch band. Fig. 6 is a side elevation of a clutch embodying this invention as applied to connect a motor vehicle engine, a portion of which is shown, with its transmission gears, not shown. Fig. 7 is a fragmental enlarged sectional detail on line $x^7$, Fig. 2, illustrating the easing means for the actuated end of the clutch band. Fig. 8 is an enlarged fragmental section on line $x^8$, Fig. 4. The clutch band is shown disengaged. Fig. 9 is a cross section of the operating cam on line $x^9$, Figs. 3 and 6. Fig. 10 is an elevation of the operating cam.

The hollow external band carrying clutch member 1 is a housing mounted on and rotating with the power shaft 2, being fixed to the flywheel 3 of said shaft by cap screws 4 extending through holes 5 in the flange 6. Said member 1 has an inwardly bent web 7 forming a spring-supporting seat 8 and is provided with an axially arranged sleeve 9 that surrounds one end of the transmission shaft 10 which in application to an automobile is connected through the usual clutch with the transmission mechanism, including the usual speed changing and reversing clutches and gears, not shown. The internal clutch member comprises a hub 11, web 12 and drum or cylindrical friction face 13. The hub 11 is keyed to the transmission shaft 10 and is journaled in the sleeve 9 which thus forms a support for the internal member and for the power receiving end of the transmission shaft. The friction face 13 is normally gripped by a friction band 14 carried by the external member 1 and having a lining 15 of asbestos, fiber or other suitable material riveted thereto by rivets 16 and also having lugs 17 and 18 that are secured to the extremities of the band by rivets or otherwise, and that extend through a slot $a$ in the external member for pivotal connection from the outside with means carried by the outer member to contract the band which has a normal tendency to expand. A rigid adjustable anchor link 19 is pivoted at one end to the lug 17 by the pivot pin 17' and adjustably anchored and pivotally mounted at the other end on the external member 1 by nuts 21 bearing on the swivel-pin 22 that is journaled in bearings 22' on the external clutch member.

An operating link 23 preferably provided between its ends with a universal joint 24 is pivoted at one end by a pivot pin 18', to the lug 18 of the operating end of the clutch band, and at the other end by a pivot pin 25 to an arm 25' of the band-operating rockshaft 26 that is journaled in capped bearings 27 on the external member 1, where it is secured in place by set collars $b$. Said rockshaft is provided between said bearings with an actuating arm or finger 28 having a rounded tip 29, adapted to fit a seat 30 in the side of a wedge means 31 in the front of a collar that is mounted upon and slidable along the sleeve 9, and is provided on one side of the seat 30 with a flange 32 and on the other side with a wedge face 33, that is inclined outwardly from the seat 30. The wedge means 31 is normally held outward by a spring 34 seated in the spring seat 8 to drive the wedge face along against the rounded tip 29 to wedge the rock shaft in position, as shown in Fig. 3, to hold the friction band 14 contracted upon the encircled internal clutch member 12, thus normally connecting the clutch members to rotate together so as to transmit power from the power shaft 2 to the transmission shaft 10. Means are provided to act in opposition to the compression spring 34 to bring the seat 30 into position to receive the rounded tip 29 and upon further movement of the wedge to cause the flange 32 to act upon the finger 29 to force its rounded tip into the rounded seat therefor which fits said tip so as to prevent any looseness when the tip is fully seated. Such means are shown in the drawings to be actuated by a foot-pedal and comprise an anti-friction thrust collar 35 having ball-bearings 36 arranged at the end of the wedge to receive the thrust of two arms 37 that extend up from the controlling rock shaft 38 mounted in bearings 39 on the automobile chassis 40 and provided with the usual foot pedal 41. The external member 1 is provided on the inside with an annular recess 42 of less width than the friction band 14 and with cylindrical shoulders 43 at the sides thereof, so that as the band is expanded into the released position shown in Fig. 4, the rivets 16 may be accommodated in the recess 42 while the back of the band comes to rest against the shoulders 43. Tangential easing cams 44 secured by rivets 45 to the external member 1 at each side of the slot $a$ provide means upon which easing-pins 46 ride to ease into gripping position the actuated end of the clutch band to which said pins are fixed, being mounted in tapped holes 47 in the lugs 18 that are fixed to the end of the band to operate it. As the wedge 31 is moved inward toward the seat 8 against the pressure of the spring 34 the finger 28 is at first released, thus allowing the band to expand, and upon further movement the flange 32 acts upon the finger 28 to forcibly rock the shaft to continue such expanding action positively until the rounded tip 29 is seated positively in the seat 30. In practical use the action of the spring 34 is normally effective through the wedge 31 to move the tip 29 out of the groove 30 and the wedge face 33 into contact therewith to thereby turn the rock shaft 26 to rock the arm 25 which in turn acts through the link connection 23, lug 18 and pivot pin 18' to force inward the actuated end of the band, the ease-pins 46 in the lug 18 meanwhile riding upon the easing cams 44 to thereby cause the band to gradually attain its clutching position upon the face 13 of the member 12. As the lining 15 of the band wears, the amplitude of movement of the free end thereof will necessarily be greater to maintain a clutching relation between the band and the member 12; and the wedge face 33 will accordingly advance upon the tip 29 of the finger 28 under the action of the spring 34, thus securing automatic adjustment to take up any wear of the friction band. The anchored end of the band may be permanently adjusted as required by the adjustable anchor link 19 and the adjusting nuts 21. To release the clutch the operator will press down upon the foot lever 41 to rock the rock shaft 38 which moves the arm 37 to slide the wedge 31 forwardly along the sleeve 9, the flange 32 of said wedge meantime acting upon the tip 29 of the finger 28 to swing said tip into the seat 30 which seat then further swings the finger 29, as the wedge is further advanced, to rock the rock shaft 26 to turn the arm 25 which through the linked connection 23, the resiliency of the band and the action of link 19, expands the band 14 from the face 13 of the internal clutch member 12. As the free end of the band is withdrawn from the member 12 the rear band face at the free end thereof contacts with the inside of the hollow member 1 and upon further withdrawal movement of the free end, the band is caused to expand against the shoulders 43 and when thus expanded every portion of the cylindrical lining 15 is out of contact with the cylindrical face 13 of the member 12 as shown in Fig. 4, thereby insuring a complete disconnection of the internal member and shaft 10 from the external member and shaft 2. When the pressure upon the foot pedal 41 is relieved the spring 34 immediately forces the wedge 31 from the spring seat 8 and the wall of the seat 30 acts abruptly against the finger 28 to actuate the same to suddenly rock the rock shaft 26 and thereby suddenly force the operating link 23 toward the link 19, thus contracting the band and forcing it against the inner rotatable member. This action will be understood by reference to Fig. 4 where the curved arrows indicate the rotation of the external clutch member and the straight arrow indicates the direction of movement of the free end of the band toward the anchored end. The easing pins riding on the easing cams 44 prevent the actuated end of the band from being forced inward at once to contact with the internal member and consequently the band will first contact with the internal member at some point intermediate the ends of the band. Then as the slide actuating rock shaft 26 is further rotated the ends of the bands are forced inward by a toggle-joint action of the links 19 and 23 with relation to the band and the connections of said links; and the cams 44 allow the free end of the band to move in gradually at the same time that the anchored end of the band moves in, until the whole band is tightly gripped upon the internal clutch member. At this time the wedge face 33 will be in contact with the rounded tip 29 of the rock finger and will act forcibly thereupon to tightly hold the band in clutching position until again released by pressure upon the foot-pedal 41.

I claim:—

1. A clutch comprising an external member, an internal member, a friction band between said members, links connected to the ends of the band respectively, means pivotally mounting one of said links on one of said members, means on such member to actuate the other link and the end of the band to which it is connected, to contract and expand the band, and wedge means to ease such end of the band toward the internal member.

2. A clutch comprising an external member; an internal member; a friction band between said members, said friction band and members being grouped substantially around a common center, a link connected to one end of the band and pivotally connected to said external member, said link and band extending from their point of connection substantially in the same direction around said internal member so that said link is put under compression when said band is put under tension, and the end of said link which is connected to the band being closer to the aforesaid common center than the end of said link which is pivotally connected to said member, so that said link urges the end of the band toward said internal member when the band is put under tension; and means also carried by the external member and connected to the second end of the band for putting said band under tension and binding it frictionally onto said internal member.

3. A clutch comprising two rotatable members, a friction band carried by one and encircling the other of said members, a wedge slidably mounted upon the band carrying member, means actuated by said cam to cause the friction band to alternately clutch and release the encircled member, and means to operate the wedge.

4. A clutch comprising two rotatable members, a friction band carried by one of said members and adapted to encircle and frictionally engage the other member, means to move the one end of said band to cause the band to tighten upon said other member and means to ease said end toward such other member to thereby cause a gradual engagement of the band with the other member.

5. A clutch comprising external and internal rotatable members, a friction band carried by the external member and adapted to frictionally engage the internal member, means to move one end of the band to cause such engagement, wedge means mounted upon the external member, pins connected with said end of the band and adapted to ride upon said wedge means as said end is moved to thereby cause a gradual engagement of the band with the internal member.

6. A clutch comprising external and internal rotatable members, a friction band adjustably carried by the external member and adapted to frictionally engage the internal member, a rock shaft provided with a finger and pivotally mounted upon said external member to operate the friction band, a wedge means slidably mounted on said external member and provided on one side with an inclined surface adapted to engage the finger to hold the clutch band in clutching relation with the internal member and resilient means to advance said inclined surface upon said finger to automatically take up any wear of the friction band.

7. A clutch comprising external and internal rotatable members, a friction band adjustably carried by the external member and adapted to frictionally engage the internal member, a rock shaft provided with a finger mounted upon said external member, means actuated by the finger to operate the frictional band, a wedge means slidably mounted on said external member and provided with a seat adapted to be carried into engagement with the finger upon movement of the wedge means to release the friction band and means to move the wedge means.

8. A clutch comprising external and internal rotatable members, a friction band carried by the external member and adapted to frictionally engage the internal member, a rock shaft having a finger and mounted upon said external member; and also having an arm, connected with one end of the band, a wedge means slidably mounted on the external member and provided with a seat, means to move said wedge means to engage the finger to cause the arm to release and tighten the friction band upon the internal member as the wedge means is moved to and fro upon the external member.

9. A clutch comprising a hollow cylindrical external member and a rotatable internal member, a friction band between said members, having one end adjustably swiveled upon the external member, means on the external member to withdraw the other end of the band from the internal member so as to contact such end with the inside of the hollow cylindrical external member and to thereby cause the band to expand against the inside of said external member so as to effect a complete release of the band from the internal member.

10. A clutch comprising a band carrying member provided with a sleeve, a drum member provided with a drum and with a hub that is journaled in said sleeve; a rock shaft journaled to the band carrying member; a band around the drum; a link pivotally connecting one end of the band with the band carrying member; a link connecting the other end of the band with an arm of the rock-shaft, and a wedge means slidable on the sleeve to actuate the rock shaft.

11. A clutch comprising a band carrying member provided with a spring seat and a sleeve, a drum member provided with a drum and with a hub that is journaled in said sleeve; a rock shaft journaled to the band carrying member; a band around the drum; a link pivotally connecting one end of the band with the band carrying member; a link connecting the other end of the band with an arm of the rock shaft; a wedge means slidable on the sleeve to actuate the rock shaft and a spring on the spring seat to slide the wedge means to actuate the cam to contract the band.

12. A clutch comprising a band carrying member provided with a spring seat and a sleeve, a drum member provided with a drum and with a hub that is journaled in said sleeve; a rock shaft journaled to the band carrying member; a band around the drum; a link pivotally connecting one end of the band with the band carrying member; a link connecting the other end of the band with an arm of the rock shaft; a wedge means slidable on the sleeve to actuate the rock shaft; a spring on the spring seat to slide the wedge means to actuate the wedge means to contract the band, and means to slide the wedge means in opposition to the spring to loosen the band.

13. The combination with a shaft, of a clutch member comprising a drum and a hub keyed on the shaft; a band-carrying clutch member in which the hub is journaled; a rock shaft journaled on the band-carrying member; a wedge means slidable on the sleeve and provided with means to actuate the rock shaft; a friction band to engage the drum; a link connecting one end of the band with the band-carrying member; a link connecting the other end of the band with an arm of the rock shaft; a spring to move the wedge means to actuate the rock shaft to contract the band and a thrust plate to move the wedge means in opposition to the spring.

14. The combination with a shaft, of a clutch member comprising a drum and a hub keyed on the shaft; a band-carrying clutch member in which the hub is journaled; a rock shaft journaled on the band-carrying member; a wedge means slidable on the sleeve and provided with means to actuate the rock shaft; a friction band to engage the drum; a link connecting one end of the band with the band-carrying member; a link connecting the other end of the band with an arm of the rock shaft; a spring to move the wedge means to actuate the rock shaft to contract the band; a thrust plate to move the wedge means in opposition to the spring; a pedal; and connections between the pedal and the thrust plate to actuate the same.

15. The combination with a shaft, of a clutch member comprising a drum and a hub keyed on the shaft; a band-carrying clutch member in which the hub is journaled; a rock shaft journaled on the band-carrying member; a wedge means slidable on the sleeve and provided with means to actuate the rock shaft; a friction band to engage the drum; a link connecting one end of the band with the band-carrying member; a link connecting the other end of the band with an arm of the rock shaft; means to ease such end toward the drum; a spring to move the wedge means to actuate the rock shaft to contract the band, and a thrust plate to move the wedge means in opposition to the spring.

16. The combination with a shaft, of a clutch member comprising a drum and a hub keyed on the shaft; a band-carrying clutch member in which the hub is journaled; a rock shaft journaled on the band-carrying member; a wedge means slidable on the sleeve and provided with means to actuate the rock shaft; a friction band to engage the drum; a link connecting one end of the band with the band-carrying member; a link connecting the other end of the band with an arm of the rock shaft; means to ease such end toward the drum; a spring to move the wedge means to actuate the rock shaft to contract the band; a thrust plate to move the wedge means in opposition to the spring; a pedal; and connections between the pedal and the thrust plate to actuate the same.

In testimony whereof, I have hereunto set my hand at Los Angeles, California, this 2d day of March, 1912.

SAMUEL C. CARTER.

In presence of—
   JAMES R. TOWNSEND,
   M. BEULAH TOWNSEND.